(12) United States Patent
Jamison et al.

(10) Patent No.: US 10,347,022 B2
(45) Date of Patent: Jul. 9, 2019

(54) PERSPECTIVE-BASED MODELING OF A SUBTERRANEAN SPACE

(71) Applicant: HALLIBURTON ENERGY SERVICES, INC., Houston, TX (US)

(72) Inventors: Dale E. Jamison, Humble, TX (US); Robert L. Williams, Spring, TX (US); Amir Bar, Houston, TX (US); Jeffrey Marc Yarus, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/539,452

(22) PCT Filed: Feb. 27, 2015

(86) PCT No.: PCT/US2015/018193
§ 371 (c)(1),
(2) Date: Jun. 23, 2017

(87) PCT Pub. No.: WO2016/137519
PCT Pub. Date: Sep. 1, 2016

(65) Prior Publication Data
US 2017/0352168 A1  Dec. 7, 2017

(51) Int. Cl.
*G06T 15/20* (2011.01)
*G06T 11/20* (2006.01)
(Continued)

(52) U.S. Cl.
CPC ............ *G06T 11/206* (2013.01); *E21B 47/00* (2013.01); *E21B 47/0002* (2013.01); *G01V 1/34* (2013.01);
(Continued)

(58) Field of Classification Search
CPC ................................ G01V 1/345; G06T 17/05
(Continued)

(56) References Cited

U.S. PATENT DOCUMENTS

| 7,190,365 | B2 | 3/2007 | Fleury |
| 2006/0235666 | A1 | 10/2006 | Assa et al. |

(Continued)

FOREIGN PATENT DOCUMENTS

WO   2014055186 A1   4/2014

OTHER PUBLICATIONS

International Search Report and Written Opinion; PCT Application No. PCT/US2015/018193; dated Nov. 27, 2015.

*Primary Examiner* — Thomas J Lett
(74) *Attorney, Agent, or Firm* — Polsinelli PC

(57) ABSTRACT

A method for graphically representing a subterranean space from the perspective of a point within the subterranean space, in some embodiments, comprises: obtaining data associated with the subterranean space, said data corresponding to a plurality of coordinates in a first coordinate system; associating the data for each of said plurality of coordinates with one or more corresponding coordinates in a second coordinate system; generating a different model of the subterranean space based on the data and said associations; and displaying the different model on a display, wherein the different model represents the subterranean space from the perspective of a point within the subterranean space.

21 Claims, 15 Drawing Sheets

(51) Int. Cl.
  *E21B 47/00* (2012.01)
  *G06T 15/10* (2011.01)
  *G06T 19/00* (2011.01)
  *G01V 1/34* (2006.01)

(52) U.S. Cl.
  CPC ............. *G06T 15/10* (2013.01); *G06T 15/20* (2013.01); *G06T 19/00* (2013.01)

(58) Field of Classification Search
  USPC ........................................................ 345/440
  See application file for complete search history.

(56) References Cited

U.S. PATENT DOCUMENTS

| | | |
|---|---|---|
| 2011/0054857 A1 | 3/2011 | Moguchaya |
| 2012/0116681 A1* | 5/2012 | Fuller .................... G01N 15/08 |
| | | 702/12 |
| 2013/0073272 A1* | 3/2013 | Wallace ................. E21B 43/00 |
| | | 703/10 |
| 2014/0232721 A1* | 8/2014 | Koren .................... G01V 1/345 |
| | | 345/427 |

* cited by examiner

US 10,347,022 B2

PERSPECTIVE-BASED MODELING OF A SUBTERRANEAN SPACE

CROSS-REFERENCE TO RELATED APPLICATIONS

This application is a national stage entry of PCT/US2015/018193 filed Feb. 27, 2015, said application is expressly incorporated herein in its entirety.

BACKGROUND

Various techniques are used to collect information about subterranean spaces. Such techniques include, for example, acoustic, electrical, electromagnetic and/or nuclear well logging procedures for determining the material properties of a formation adjacent to a wellbore. Information—such as stress data, formation porosity and permeability, and thermal shift data—collected using these and other techniques is used to build earth models that integrate the collected information with graphical representations of the subterranean area being modeled. These earth models, however, typically present information in a suboptimal manner that precludes easy and rapid access to data of interest.

BRIEF DESCRIPTION OF THE DRAWINGS

Accordingly, there are disclosed in the drawings and in the following description methods and systems for modeling a subterranean space from the perspective of a point within the subterranean space. In the drawings.

Figure 1:
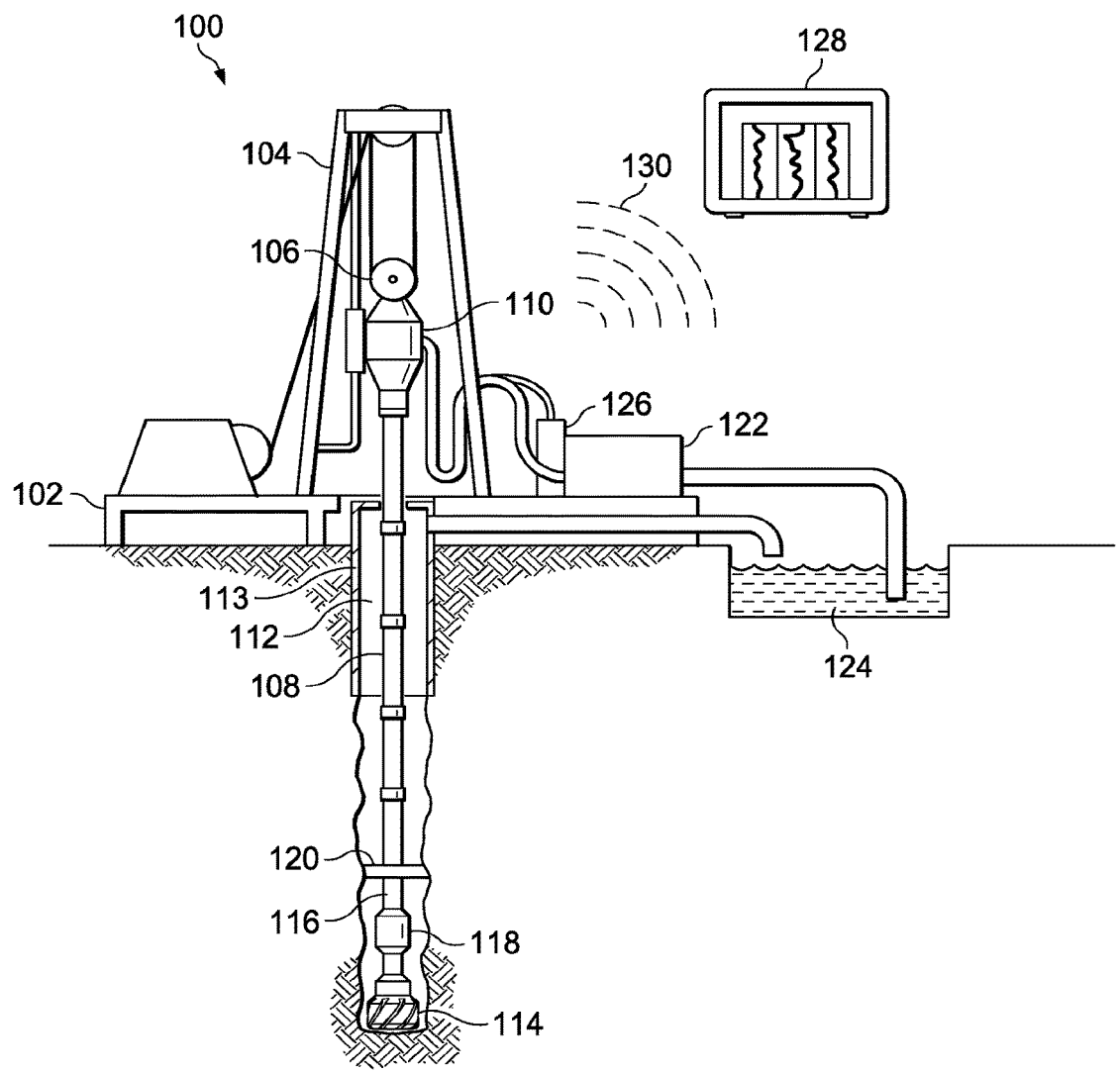
FIG. 1 is a schematic diagram of an illustrative drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are techniques for modeling a subterranean space from the perspective of a point within the subterranean space. The techniques generally entail obtaining either an earth model of the subterranean space of interest or formation and wellbore data that could be used to generate such an earth model. Earth models typically present such data using coordinates in a Cartesian coordinate system. Thus, the disclosed techniques include converting the data from a Cartesian coordinate system to a spherical coordinate system. In at least some embodiments, this conversion is performed by associating the data for each Cartesian coordinate with a corresponding spherical coordinate using known conversion equations. A new spherical coordinate model is then generated using the data and the associations between the data and the spherical coordinates. Some or all of the model may be displayed on a computer display and a user may interact with the model to visualize various aspects of the subterranean space from a specific point within the subterranean space. For example, the user may use the new model to visualize the subterranean space surrounding a wellbore from the perspective of a point within the wellbore. The newly-generated model facilitates this type of view due to its spherical coordinate system, which provides a 360-degree view of subterranean space data about an axis (e.g., the wellbore).

In some embodiments, the new model provides a 360-degree view along a single horizontal plane (e.g., with a spherical coordinate system $\phi$ angle of 90 degrees relative to the axis of the wellbore). In other embodiments, the new model provides a 360-degree view along two or more planes, thereby enabling the visualization of subterranean space data in multiple $\phi$ angle directions from the perspective of a single point in the subterranean space. In some embodiments, the subterranean space data is modified prior to display—for instance, the rate at which the data changes is displayed in lieu of the data itself, or the result of a function of the data is displayed in lieu of the data itself, or the data is otherwise modified in some way to maximize its relevance to the point in the subterranean space whose perspective is being modeled.

The embodiments described below are not limited to visualizing the subterranean space from a single point "looking outward." To the contrary, the subterranean space data in the new spherical coordinate model may be viewed from any vantage point within the subterranean space. In addition, the embodiments are not limited to conversions between Cartesian and spherical coordinate systems. On the contrary, conversions between other coordinate systems—such as Cartesian-to-polar coordinate system conversions—are contemplated.

Figure 2:
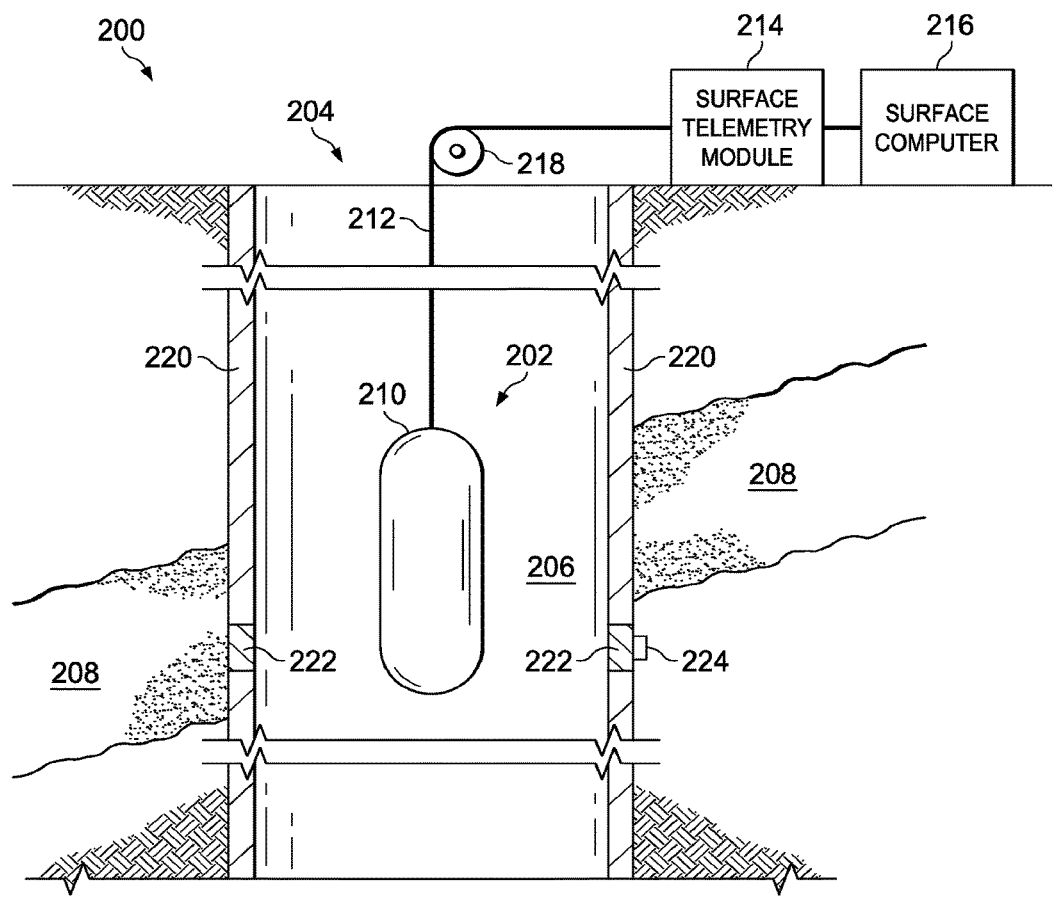
FIG. 2 is a schematic diagram of an illustrative wireline environment.
Figure 3:
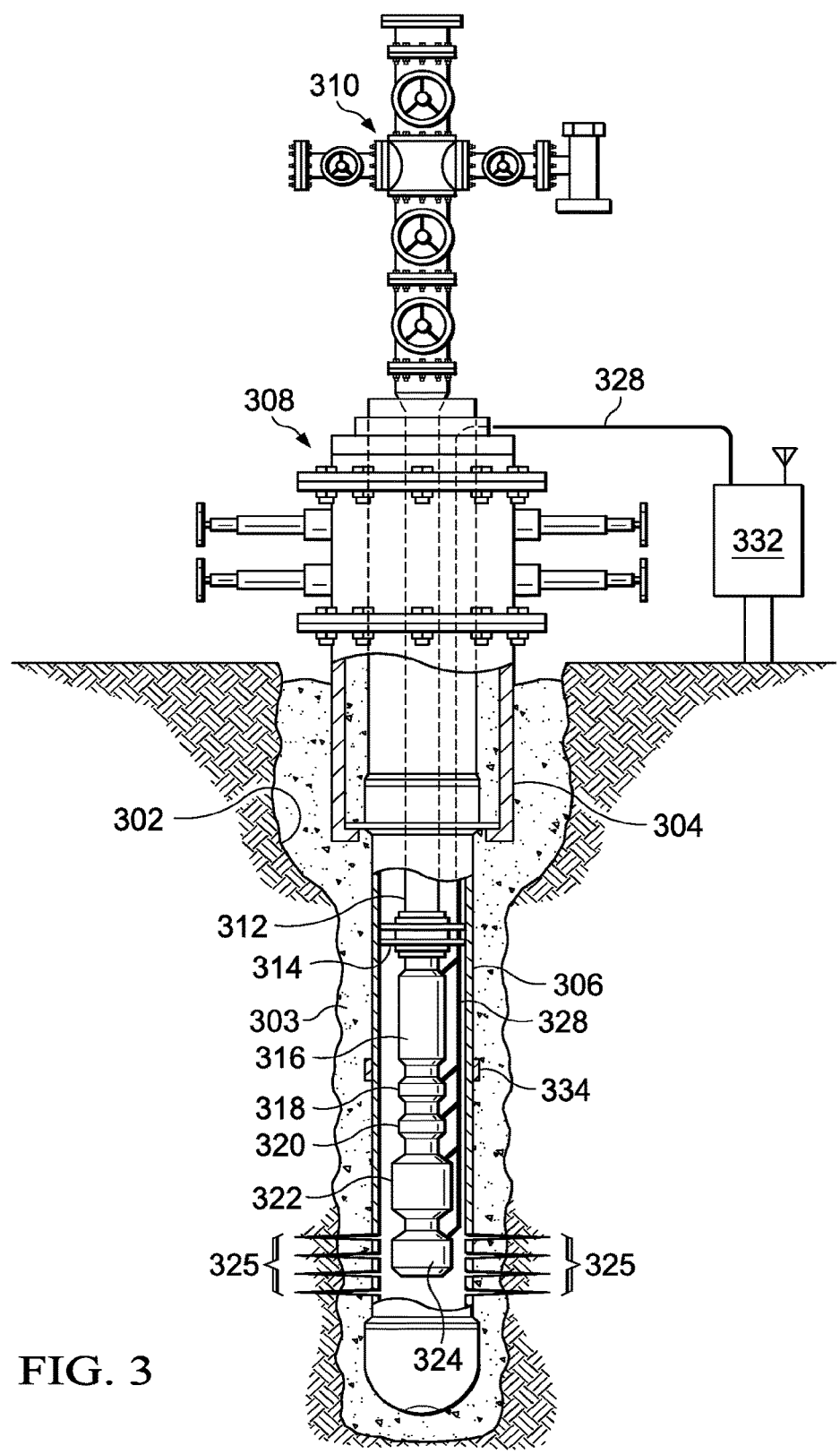
FIG. 3 is a schematic diagram of a producing well.

FIGS. 1-3 represent various subterranean environments with which the disclosed subterranean modeling techniques may be implemented. The disclosed modeling techniques are not limited to the particular examples shown in FIGS. 1-3, however, and the scope of disclosure encompasses any and all subterranean environments and areas for which data (e.g., formation properties) may be obtained and modeled.

In particular, FIG. 1 is a schematic diagram of an illustrative drilling environment. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings from the borehole 112 into the retention pit 124 and aids in maintaining the integrity of the borehole. Formation samples may be extracted from the drilling fluid at any suitable time and location, such as from the retention pit 124. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased).

The drill collars in the BHA 116 are typically thick-walled steel pipe sections that provide weight and rigidity for the drilling process. The thick walls are also convenient sites for installing transmitters, receivers and logging instruments that measure downhole conditions, various drilling parameters, and characteristics of the formations penetrated by the borehole. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors in accordance with commands received from the surface, and it provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable, such as electromagnetic and acoustic telemetry. At least some of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1 as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 116 via electromagnetic or acoustic telemetry or any other suitable communication technique. The scope of disclosure is not limited to these particular examples of data processing units.

FIG. 2 is a schematic diagram of an illustrative wireline environment. More specifically, FIG. 2 illustrates a logging system 200 in accordance with at least some embodiments. Logging system 200 comprises a wireline logging tool 202 disposed within a borehole 204 proximate to a formation 208 of interest. The borehole 204 contains a casing string 220 and casing fluid 206, which may comprise one or more of oil, gas, fresh water, saline water, or other substances. The tool 202 comprises a sonde 210 within which various subsystems of the tool 202 reside. These subsystems are equipped to measure various parameters associated with the formation and wellbore. In the illustrative case of FIG. 2 the sonde 210 is suspended within the borehole 204 by a cable 212. Cable 212, in some embodiments a multi-conductor armored cable, not only provides support for the sonde 210, but also in these embodiments communicatively couples the tool 202 to a surface telemetry module 214 and a surface computer 216. The tool 202 may be raised and lowered within the borehole 204 by way of the cable 212, and the depth of the tool 202 within the borehole 204 may be determined by depth measurement system 218 (illustrated as a depth wheel). The casing string 220 may be composed of multiple segments of casing that are joined using casing collars, such as collar 222. In some embodiments, tools (e.g., electrodes, logging equipment, communication equipment including fiber optics and transmitters and/or receivers) may be included within, coupled to or adjacent to the casing string 220 and/or the collar 222. For example, FIG. 2 includes a transceiver 224 that functions as a transmitter, receiver or both and communicates with other transmitters or receivers in other parts of the borehole 204, within the sonde 210 or at the surface.

FIG. 3 is a schematic diagram of a producing well with a borehole 302 that has been drilled into the earth. Such boreholes, examples of which are described above with respect to FIGS. 1 and 2, are routinely drilled to ten thousand feet or more in depth and can be steered horizontally for twice that distance. The producing well includes a casing header 304 and casing 306, both secured into place by cement 303. Blowout preventer (BOP) 308 couples to casing header 306 and production wellhead 310, which together seal in the well head and enable fluids to be extracted from the well in a safe and controlled manner.

The use of measurement devices permanently installed in the well facilitates monitoring of the well and/or the surrounding formation. The different transducers send signals to the surface that may be stored, evaluated and used to monitor the well's operations. Such signals may be transmitted using, e.g., a transmitter 334 that couples to or is disposed within the casing 306 or a casing of the collar 306. Such a transmitter may communicate with a receiver in any part of the system shown in FIG. 3, such as a receiver disposed in another part of the casing 306, within a different casing collar, within the well, or at the surface. Near-wellbore measurements are periodically taken at the producing well and combined with measurements from other wells within a reservoir, enabling the overall state of the reservoir to be monitored, simulated and assessed. These measurements may be taken using a number of different downhole and surface instruments, including, but not limited to, temperature and pressure sensor 318 and flow meter 320. Additional devices also coupled in-line along production tubing 312 include downhole choke 316 (used to vary the fluid flow restriction), electric submersible pump (ESP)

322 (which draws in fluid flowing from perforations 325 outside ESP 322 and production tubing 312), ESP motor 324 (driving ESP 322), and packer 314 (isolating the production zone below the packer from the rest of the well). Additional surface measurement devices may be used to measure, for example, the tubing head pressure and the electrical power consumption of ESP motor 324. Although the example of FIG. 3 shows a well that incorporates an ESP, the disclosed systems and methods may also be used with wells that incorporate other systems for assisting with the extraction of fluids (e.g., gas lift systems), or with wells without such assist systems that rely on the pressure already present in the formation and/or induced by the injector wells.

Each of the devices along production tubing 312 couples to cable 328, which is attached to the exterior of production tubing 312 and is run to the surface through blowout preventer 308 where it couples to control panel 332. Cable 328 provides power to the devices to which it couples, and further provides signal paths (electrical, optical, etc.) that enable control signals to be directed from the surface to the downhole devices, and for telemetry signals to be received at the surface from the downhole devices. The devices may be controlled and monitored locally by field personnel using a user interface built into control panel 332, or they may be controlled and monitored by a computer system (not specifically shown). Communication between control panel 332 and such a computer system may be via a wireless network (e.g., a cellular network), via a cabled network (e.g., a cabled connection to the Internet), or a combination of wireless and cabled networks.

Figure 4A:
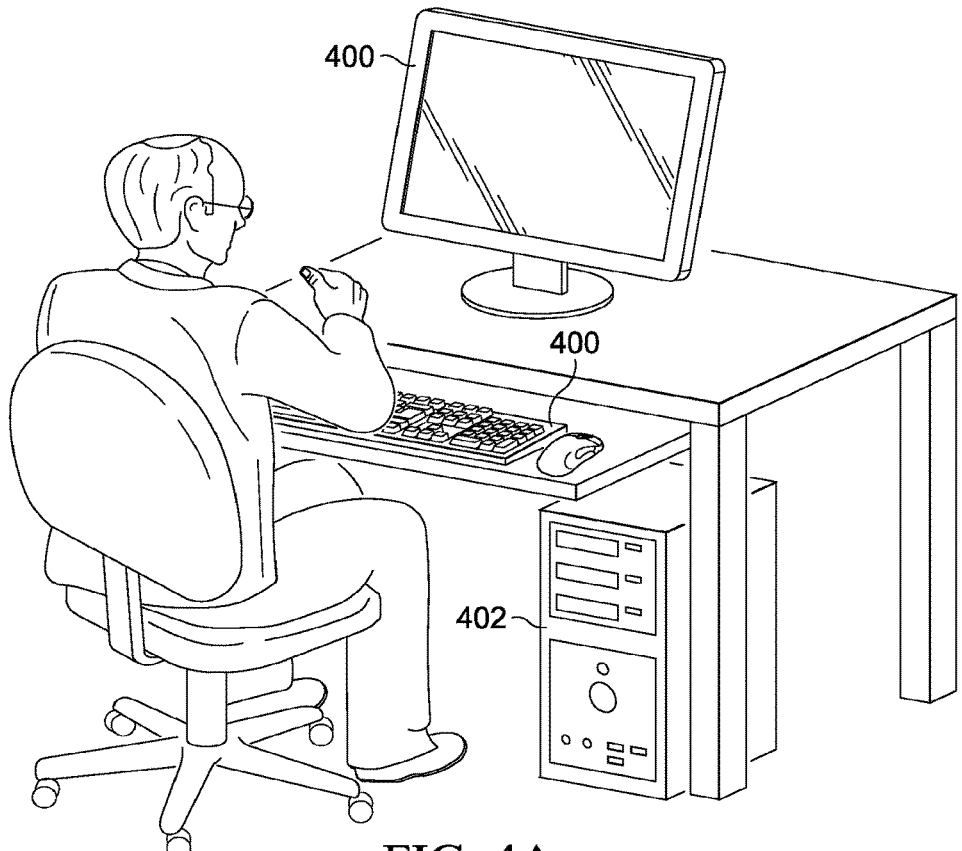
FIG. 4A is an illustration of personnel operating a workstation.
Figure 4B:
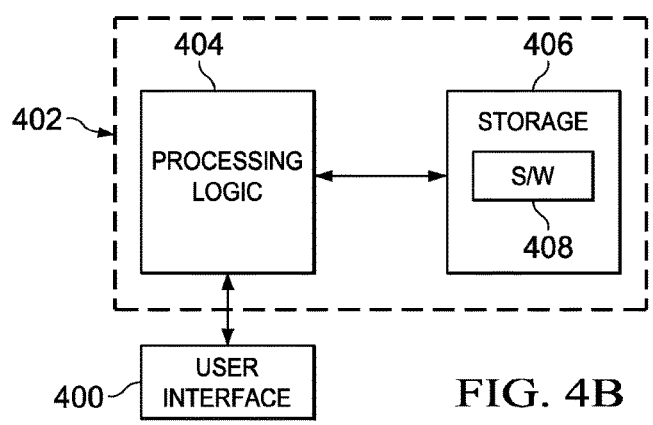
FIG. 4B is a block diagram of the components of a workstation.

A geo-modeler, such as that shown in FIG. 4A, employs a user interface 400 (including a display and one or more input devices) of a workstation 402 that implements the techniques disclosed herein. As FIG. 4B depicts, the workstation 402 couples to the user interface 400 and includes processing logic 404, storage (e.g., non-volatile memory) 406 and software code 408 (e.g., any suitable software code written by one of ordinary skill in the art to perform the techniques disclosed herein, possibly in tandem with one or more commercially available software packages, such as MATLAB®, to perform computations associated with the disclosed modeling techniques). The geo-modeler uses the interface 400 to interact with the processing logic 404 as the logic executes the software code 408. The processing logic 404 receives input from the geo-modeler via the one or more input devices (e.g., keyboard, mouse) of the user interface 400 and provides output to the geo-modeler via the display of the user interface 400. The workstation 402 is, or communicates with, one or more of the surface-level computing devices (e.g., processing unit 128) shown in FIGS. 1-3.

Figure 5:
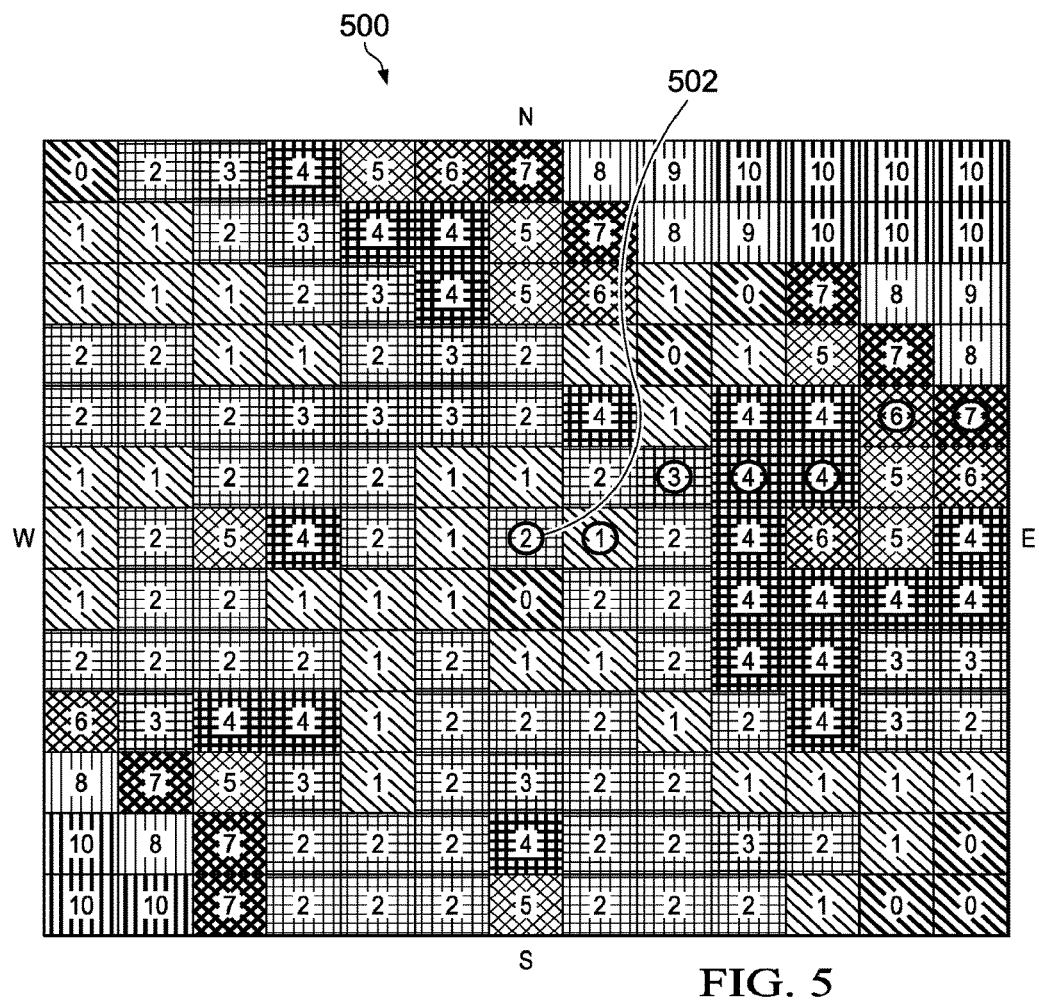
FIG. 5 is a top-down view of a single plane of the earth model of a subterranean space.

FIG. 5 is a top-down view of a single plane of the earth model of a subterranean space. Specifically, FIG. 5 shows an earth model plane 500 that is based on a Cartesian coordinate system. Numeral 502 indicates the center of the earth model plane 500, which serves as the origin for coordinate system purposes. Each of the squares shown in the plane corresponds to a different Cartesian coordinate relative to the origin. The numerical values within the squares indicate the magnitude of a hypothetical parameter associated with the subterranean space being modeled. Thus, for example, at the center 502 of the subterranean space being modeled, the parameter of interest has a magnitude of 2. Immediately to the east, north and west of the center 502 the parameter has a magnitude of 1, while the parameter immediately to the south of the center 502 has a magnitude of 0. The parameter of interest may be any suitable parameter (e.g., stress, permeability), and such parameters may be obtained using any suitable means—for example, using logging or other measurement tools in the environments depicted in FIGS. 1-3.

Figure 6:
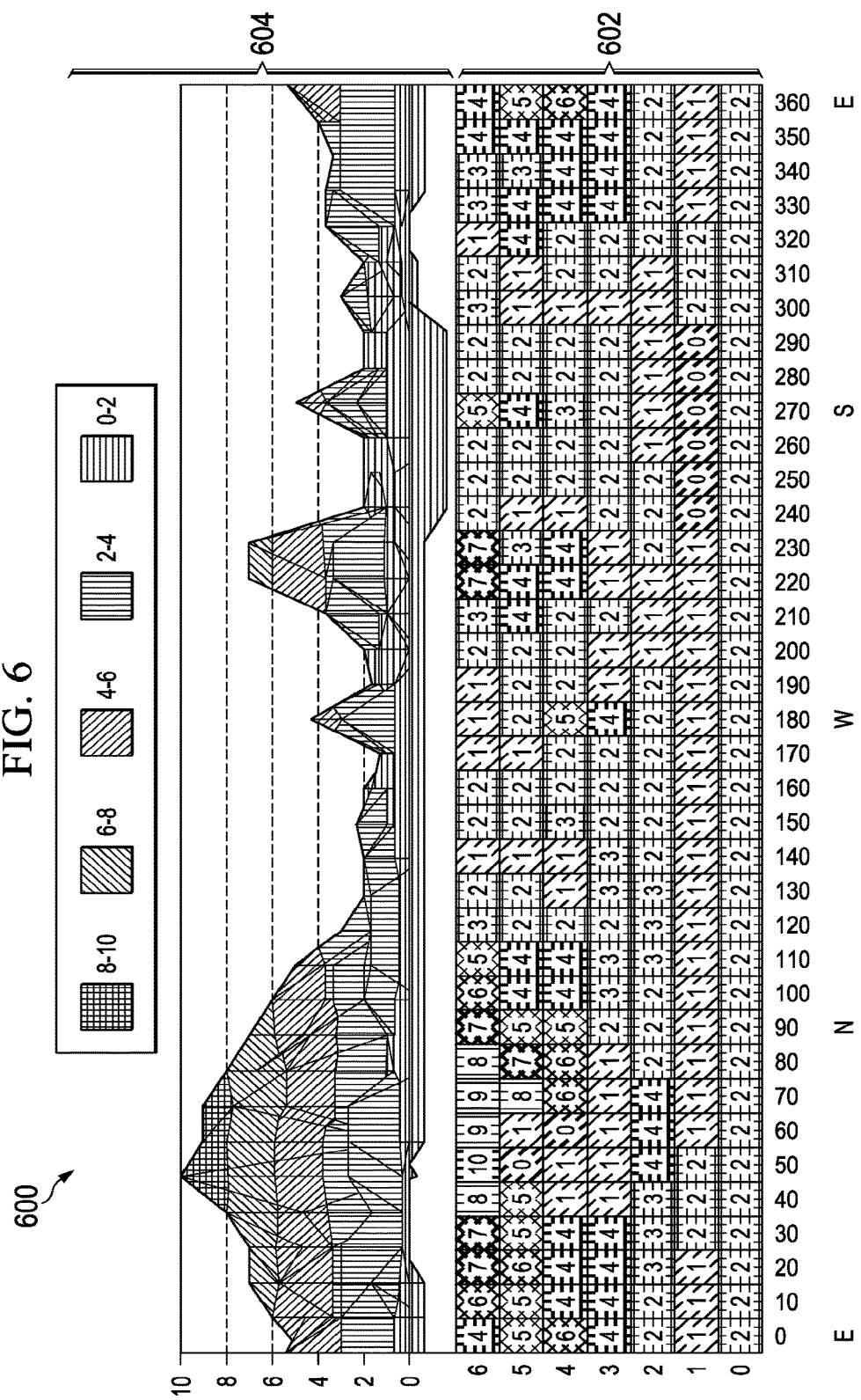
FIG. 6 is a landscape view of data obtained from an earth model plane from the perspective of a single point within the subterranean space.

FIG. 6 is a 360-degree landscape view 600 of data obtained from the earth model plane 500. More specifically, the landscape view 600 is generated by first converting the earth model data from a Cartesian coordinate system (as shown in FIG. 5) to a polar coordinate system and then re-formatting the polar coordinate system data into the row-and-column format shown in FIG. 6. Each column of grid 602 represents a different azimuthal angle relative to the polar axis (in this case, the polar axis is due east from the center 502 in FIG. 5). The bottom row of grid 602 labels the azimuthal angle that corresponds to each column. The second-to-bottom row (labeled as row 0) in the grid 602 corresponds to the center 502 (i.e., the vantage point in the subterranean space whose perspective is shown in the landscape view 600), and thus each square in the bottom row corresponds to a parameter magnitude of 2. Each successive row from the third-to-bottom row to the top row (labeled as rows 1-6) in the grid 602 corresponds to a different radial length from the center 502. Thus, for example, the first column on the left in the grid 602 has an azimuthal angle of 0, meaning that this column contains parameter values from the center point 502 in FIG. 5 and from coordinates due east of the center point 502. Accordingly, in that first column, the parameter magnitude of 2 in row 0 corresponds to the center point 502; the parameter magnitude of 1 in row 1 corresponds to the coordinate immediately to the east of center point 502; the parameter magnitude of 2 in row 2 corresponds to the next coordinate to the east; the parameter magnitude of 4 in row 3 corresponds to the next coordinate to the east, and so on.

Because the earth model plane 500 is rectangular, not all magnitudes present in the plane 500 can be used in a polar-coordinate-based grid (e.g., grid 602), particularly at certain angles in the plane 500 (e.g., a 20 degree azimuthal angle from east). In such situations, the magnitudes may be selected from the plane 500 to maintain as accurate a description of the earth model data as possible in the grid 602. For example, because the plane 500 is rectangular and Cartesian, at a 20 degree angle from the center point 502 there is no direct, linear path of squares from the center point 502. Thus, the column of grid 602 corresponding to 20 degrees contains the values 2, 1, 3, 4, 4, 6 and 7, which are marked with circles in plane 500. In some embodiments, interpolation techniques may be used instead. The graph 604 is an optional component of the landscape view 600 and may be shown in lieu of, or in addition to, the grid 602. Each vertical slice of the graph 604 is generated using the magnitudes in the grid column directly below that slice.

Figure 7:
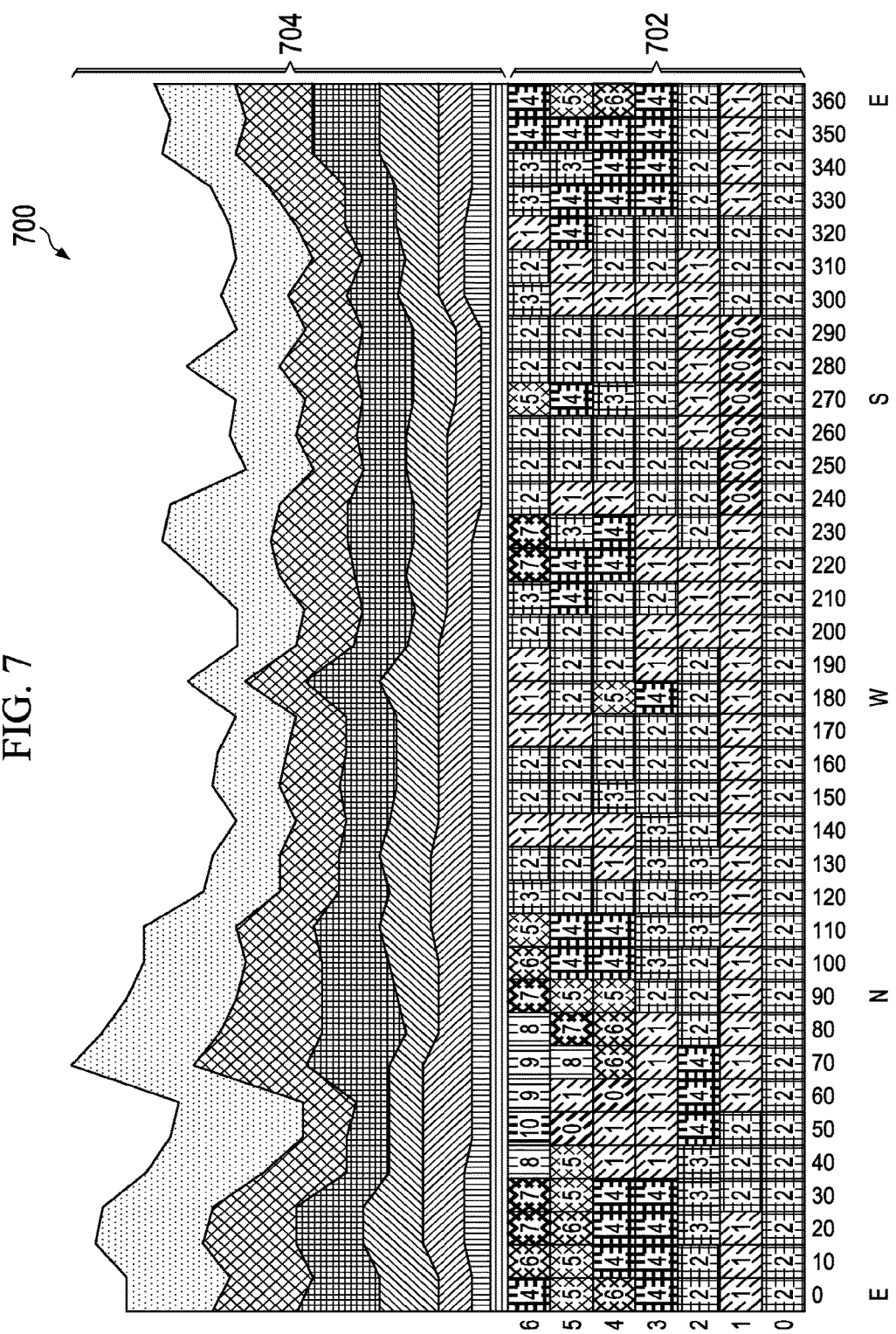
FIG. 7 is another landscape view of data obtained from an earth model plane from the perspective of a single point within the subterranean space.

FIG. 7 is another landscape view of data obtained from the earth model plane 500 from the perspective of a single vantage point within the subterranean space (i.e., center point 502). The grid 702 is identical to grid 602 and is generated the same way as grid 602 (i.e., using a Cartesian-to-polar coordinate system conversion), but the graph 704 is a line graph, and each vertical slice of the line graph is formed using the magnitudes in the grid column directly below that slice.

The data shown in FIGS. 5-7 is generally represented in the form of digital, binary values, each of which corresponds to a different coordinate. The scope of the disclosure is not limited to such embodiments, however. In at least some embodiments, the earth model data that is obtained and used may be in a continuous (i.e., analog) format. For example, a resistivity tool may capture data in the form of a continuous analog signal, and this data may be used in the manner described above with respect to FIGS. 5-7 to generate models as described herein.

Earth model data in Cartesian coordinate format may be converted to coordinate systems other than the polar coordinate system. For example, in at least some embodiments, the Cartesian-coordinate-formatted data may be converted to a spherical coordinate system. As described below, converting coordinate systems for data at a single depth in an earth model produces a 360-degree landscape view along a horizontal plane (i.e., a "flat" or "planar" model). Converting data obtained from multiple depths in the earth model produces 360-degree landscape views along multiple planes in three-dimensional space, thereby enabling the visualization of subterranean space data in multiple horizontal planes. Converting data obtained from planes that intersect at a common point but that are oriented in different directions produces a 360-degree view from that point in all such directions.

Figure 8A:
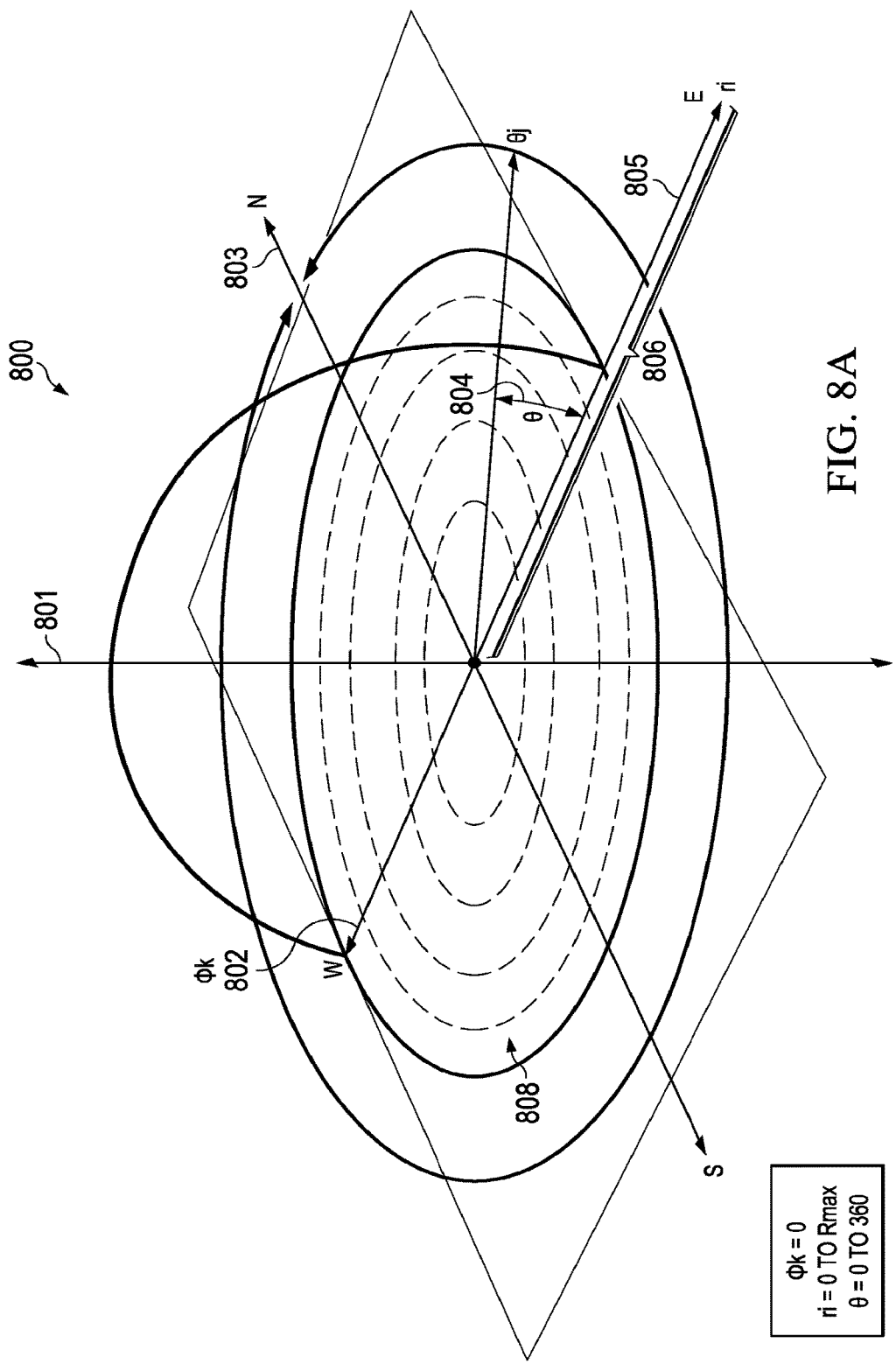
FIGS. 8A-8C are conceptual diagrams illustrating the formation of a model.
Figure 8B:
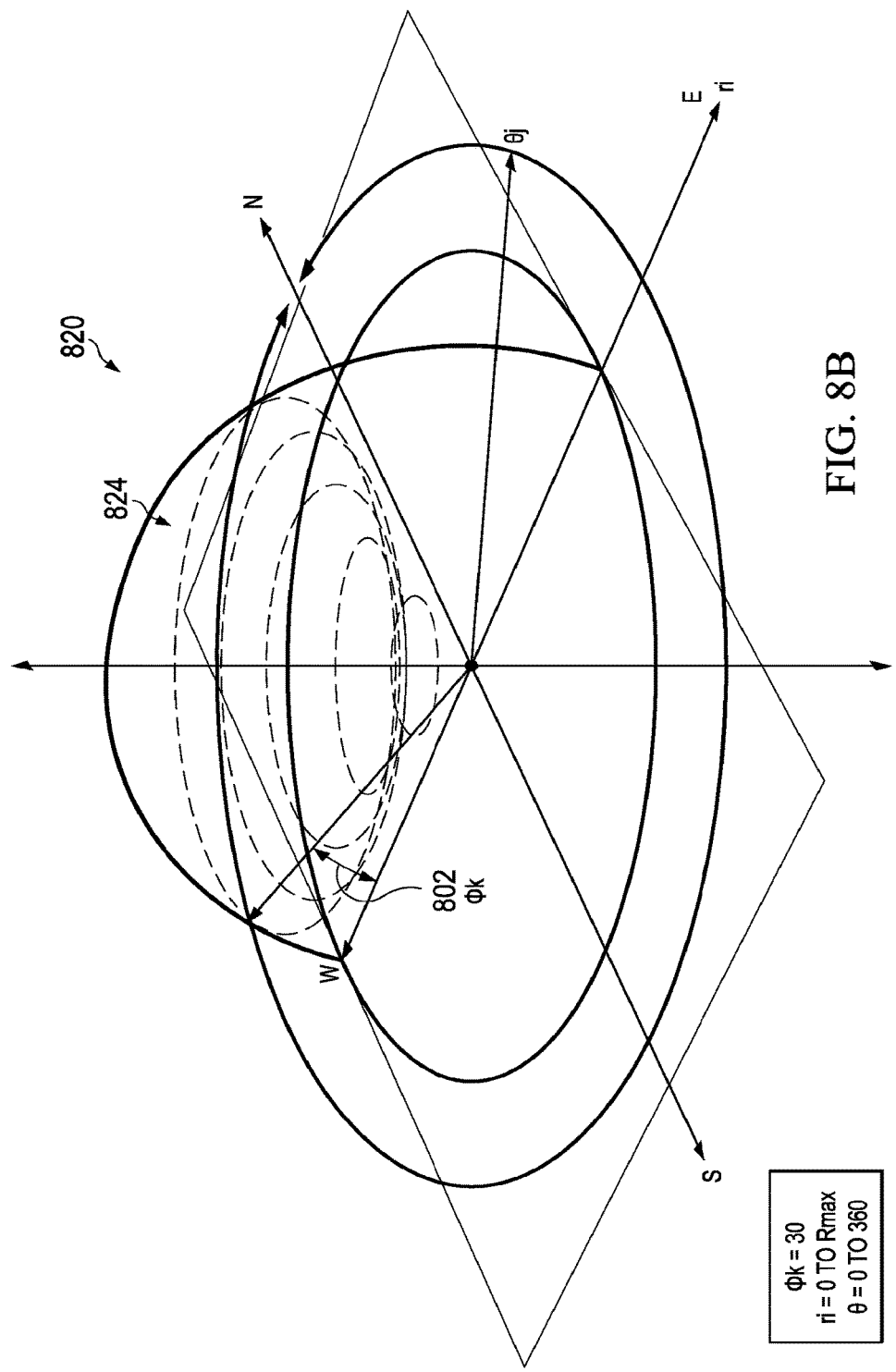
Figure 8C:
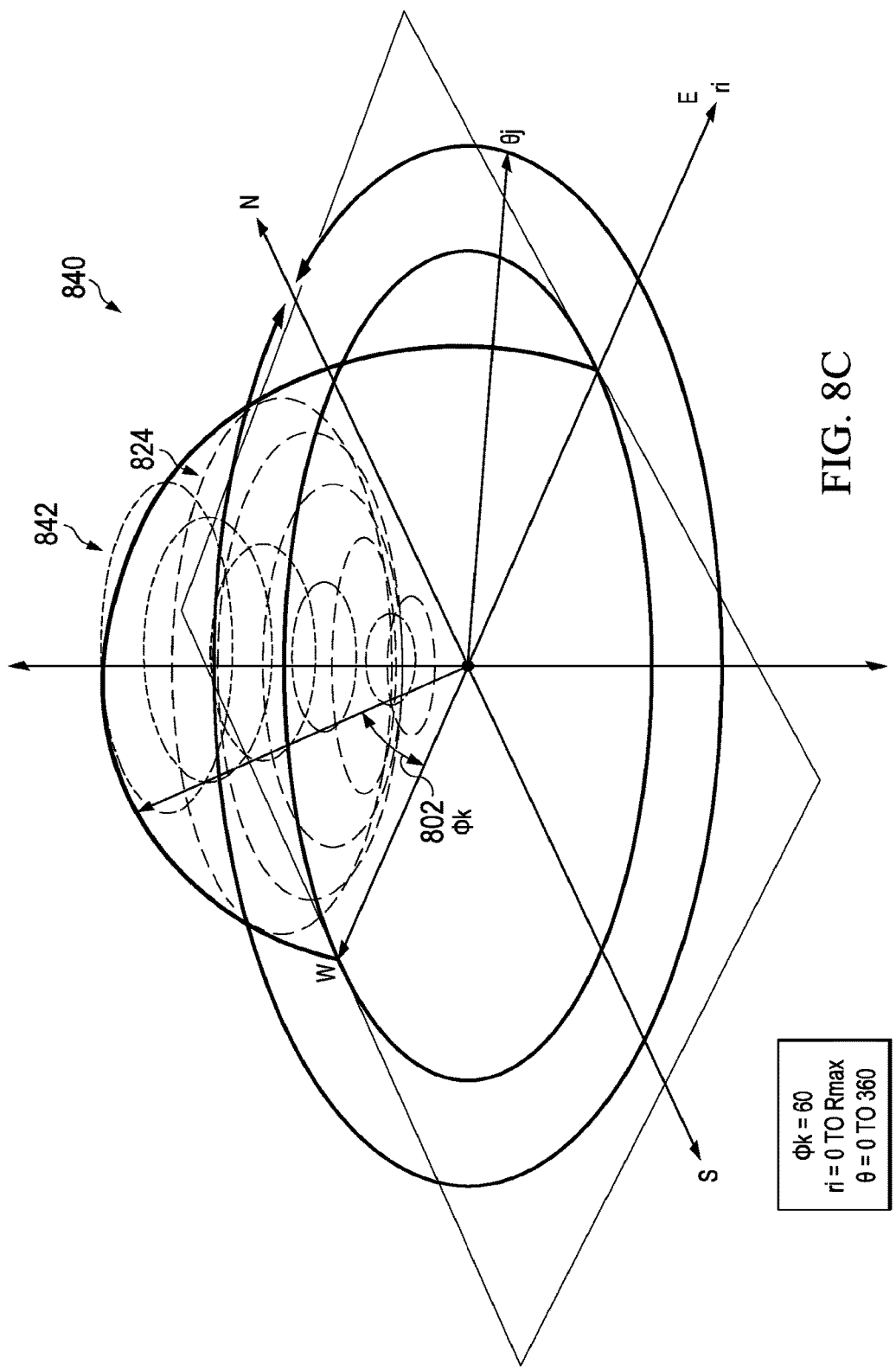

FIGS. 8A-8C are conceptual diagrams demonstrating the manner in which 360-degree landscape views may be generated for different φ angles in a spherical coordinate system. Specifically, FIG. 8A shows a three-dimensional, spherical coordinate system 800. The system 800 includes a vertical axis 801 (e.g., corresponding in at least some embodiments to the axis of a wellbore), a north-south horizontal axis 803 and an east-west horizontal axis 805. Coordinates in the spherical coordinate system 800 are specified using a polar angle φ 802, an azimuthal angle θ 804, and a radial distance r 806 from the origin (i.e., the intersection point of the axes 801, 803 and 805). In some embodiments, polar angle φ 802 is measured relative to the western arm of the axis 805 and along a vertical plane. In some embodiments, azimuthal angle θ 804 is measured relative to the eastern arm of the axis 805 and along a horizontal plane. In the illustrative example of FIG. 8A, the angle φ 802 is held constant at 0 while the angle θ 804 ranges from 0 to 360 and the radial distance r 806 ranges from 0 to the maximum value $R_{MAX}$ as determined by the geo-modeler. These ranges for φ, θ and r form the constellation of coordinates 808 that will be populated using earth model data. This constellation of coordinates has the appearance of a "flat" or "planar" disk, since the angle φ 802 remains constant at 0 while the angle θ 804 makes a 360 degree sweep for all values r (0 . . . $R_{MAX}$).

Earth model data is used to populate the constellation of spherical model coordinates by associating the earth model data for each of the Cartesian coordinates with corresponding coordinates in the spherical model. The spherical model coordinates that correspond to the Cartesian coordinates may be determined using the following equations:

$$r = \sqrt{x^2 + y^2 + z^2} \quad (1)$$

$$\theta = \tan^{-1}\left(\frac{y}{x}\right) \quad (2)$$

$$\phi = \cos^{-1}\left(\frac{z}{r}\right) \quad (3)$$

Thus, for a particular set of Cartesian coordinates (x, y, z) in the earth model of the subterranean space of interest, equations (1)-(3) may be used to calculate the corresponding spherical coordinates (r, θ, φ). The earth model data present at that particular set of Cartesian coordinates is then used to populate the spherical model at the calculated spherical coordinates. Because the illustrative example of FIG. 8A is a planar disk due to a non-varying angle φ 802, the earth model data will likewise be culled from a single plane in the earth model.

The constellation of spherical coordinates that is populated with earth model data is planar (e.g., a flat disk) in FIG. 8A, but in FIGS. 8B and 8C, the angle φ 802 is raised above 0 to result in a cone-shaped constellation. For example, as shown in the spherical coordinate system 820, the polar angle φ 802 is 30 degrees, while the azimuthal angle θ ranges from 0 to 360 degrees and radial distance r ranges from 0 to $R_{MAX}$. This results in a cone-shaped constellation 824, as shown. Increasing the polar angle φ 802 even further to 60 degrees creates a cone-shaped constellation 842 with a narrower base than the constellation 824, as shown in the spherical coordinate system 840 of FIG. 3C. The coordinates in these constellations 824, 842 are populated as described above with respect to FIG. 8A. The scope of this disclosure is not limited to generating coordinate constellations in the manner shown in FIGS. 8A-8C. A spherical coordinate constellation of any form may be used.

As described above with respect to FIGS. 5-7, data in the Cartesian coordinate system (FIG. 5) may be converted into the polar coordinate system and then re-formatted into a landscape view (FIGS. 6 and 7). In a similar manner, data converted from the Cartesian coordinate system to the spherical coordinate system (FIGS. 8A-8C and equations (1)-(3)) may subsequently be re-formatted into a landscape view like that of FIGS. 6 and 7.

Figure 9:
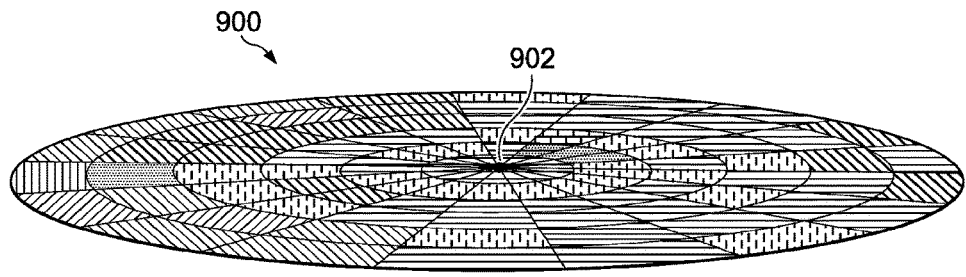
FIG. 9 is a diagram of a planar heat map disk model of a subterranean space adjacent to a wellbore.

FIG. 9 is an illustrative diagram of a circular heat map disk model 900 of a subterranean space adjacent to a wellbore. Such a planar, circular disk may be generated using a polar coordinate system or, alternatively, a spherical coordinate system that maintains a constant φ angle (e.g., FIG. 8A). Numeral 902 is the center of the disk and represents the subterranean vantage point whose perspective is being modeled. The disk model 900 as shown in FIG. 9 is a heat map, meaning that different colors or shades may be used to represent different quantities (e.g., different magnitudes of a parameter). A geo-modeler, such as that shown in FIG. 4A, may use an input device to select the disk model 900, which causes a landscape view (such as those shown in FIGS. 6 and 7, or variants thereof) of the disk model 900 to be generated.

Figure 10:
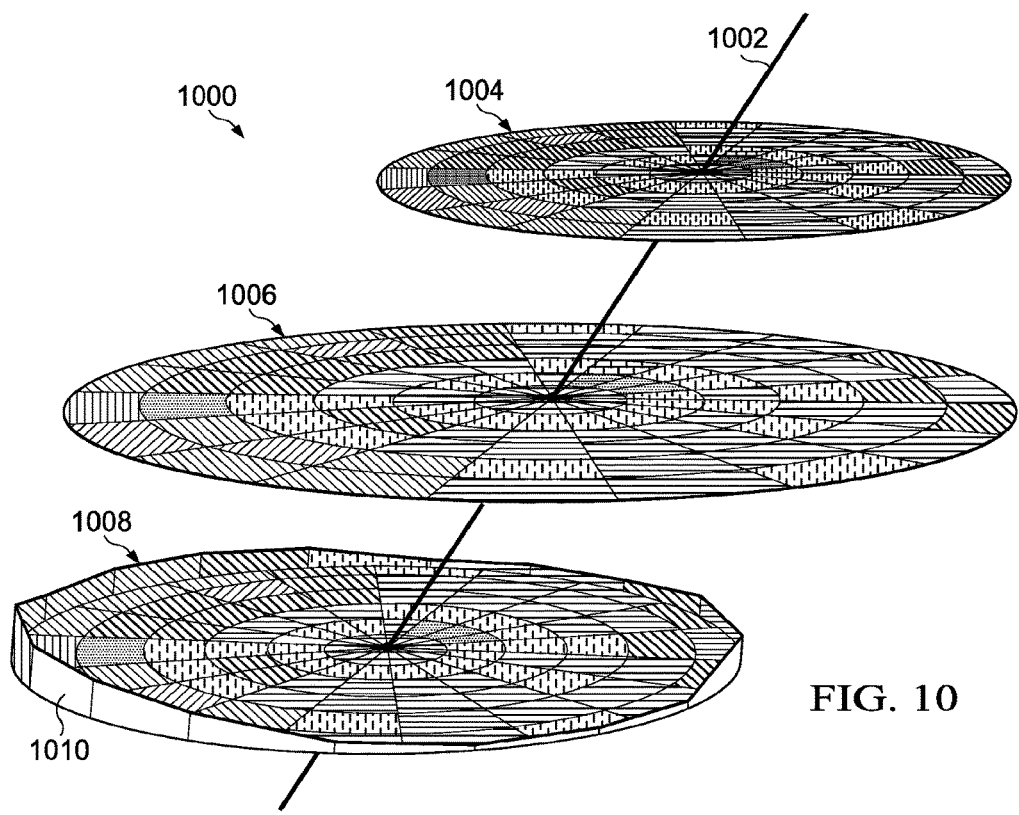
FIG. 10 is a diagram of a multi-disk model of a subterranean space.

The workstation of FIG. 4B may provide the geo-modeler with a graphical representation of a wellbore with a plurality of circular disks at different depths, as shown in FIG. 10. More specifically, FIG. 10 is a diagram of a multi-disk model 1000 of a subterranean space. The model 1000 includes a wellbore 1002 with circular disks 1004, 1006 and 1008. Each of the disks 1004, 1006, 1008 represents earth model data at a different depth along the wellbore 1002. Variations in characteristics of the disks reflects differences in how the disks are generated. Disk 1004 has a smaller radius than disk 1006, indicating that the radial length used to generate disk 1004 is smaller than that used to generate disk 1006. All three disks in FIG. 10 are roughly parallel, with each other but are not perpendicular to the wellbore 1002, indicating that they have common φ angles that are not 90 degrees (with respect to the axis of the wellbore).

Figure 11:
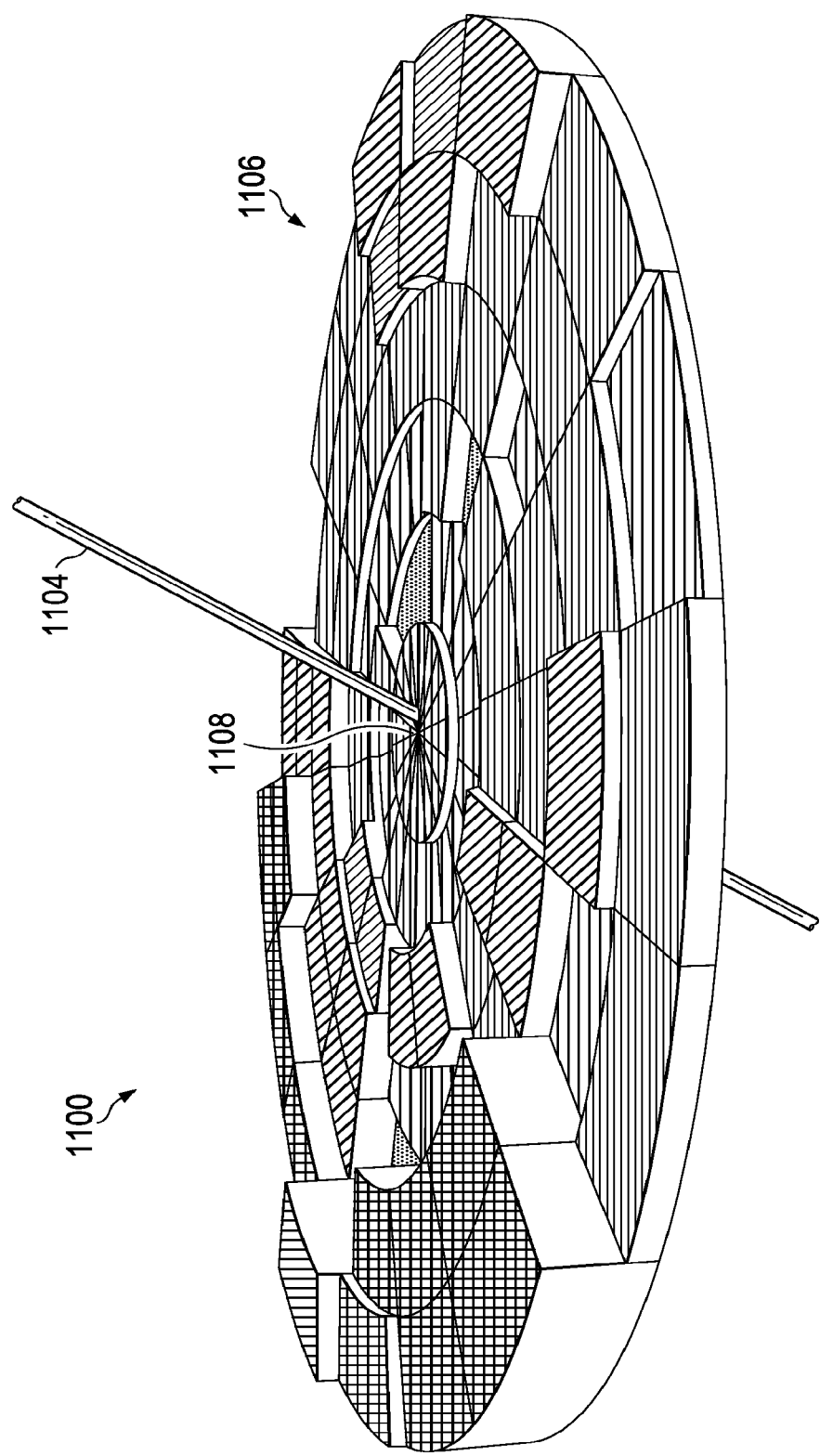
FIG. 11 is a diagram of a bar graph heat map disk model of a subterranean space.

The disks may be presented in different formats in addition to or in lieu of heat maps. For example, disk 1008 includes a line graph feature 1010. Similarly, FIG. 11 shows a model 1100 including a disk 1106 having a center 1108 disposed along a borehole 1104. As shown, the disk 1106 contains a heat map that is enhanced with a bar graph. The bars may indicate different parameters, different rates, differing results of functions applied to the data in the disks, or any other suitable quantity or quality.

Figure 12:
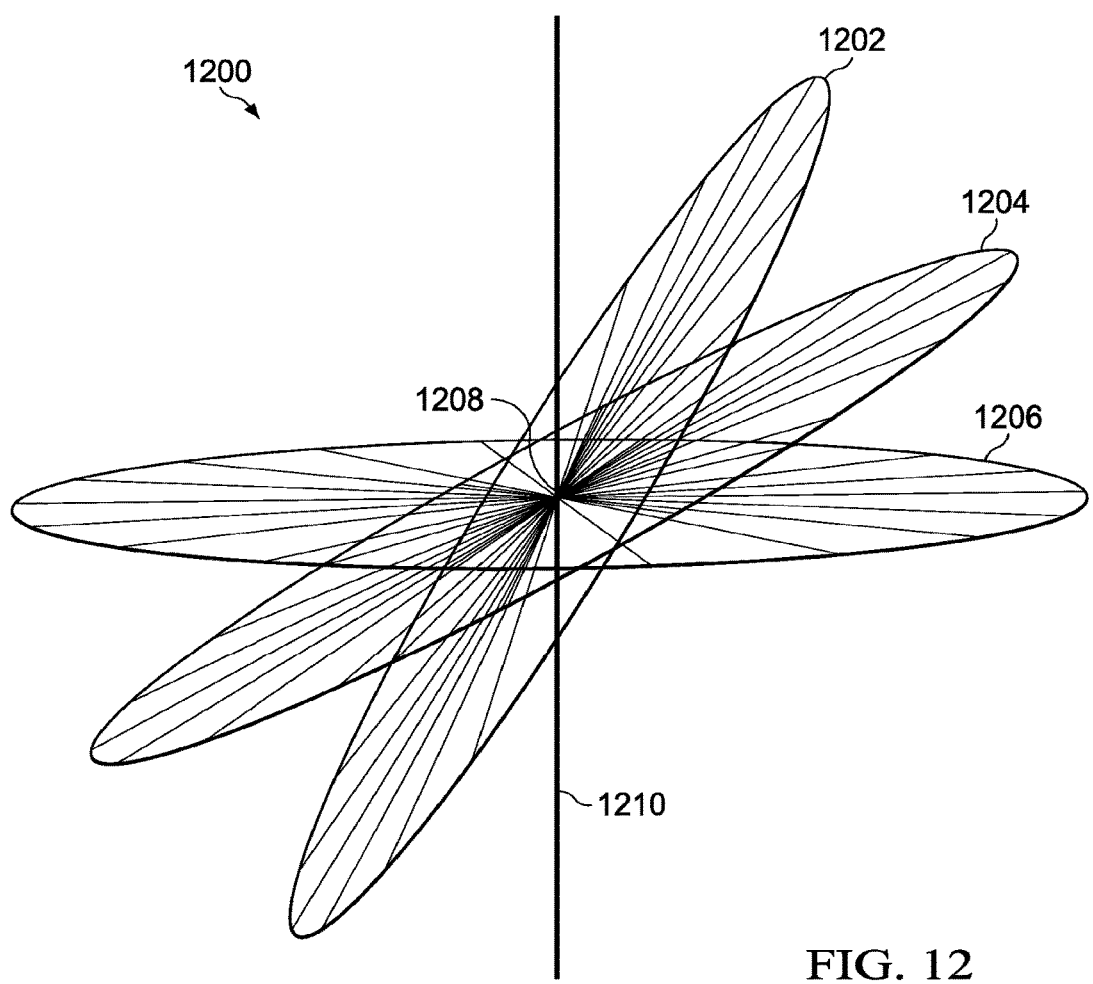
FIG. 12 is a diagram of another multi-disk model of a subterranean space.

FIG. 12 is a diagram of another multi-disk model 1200 of a subterranean space. In model 1200, multiple disks 1202, 1204, and 1206—as well as other such disks oriented in different azimuthal directions (not specifically shown)—are all disposed on different planes and converge at a single point 1208 along the borehole 1210. In such embodiments, the model provides 360-degree landscape views in numerous directions from the perspective of the point 1208—that is, a different 360-degree view along each of the planes shown. The greater the number of disks on different planes that are included in the model 1200, the greater the flexibility that is provided to a user desiring to view different parts of the modeled subterranean space. Theoretically speaking, an infinite number of disks on different planes (each disk having the same radial length) would result in a model 1200 that is a complete sphere, thus providing the user with 360-degree views in all directions.

Figure 13:
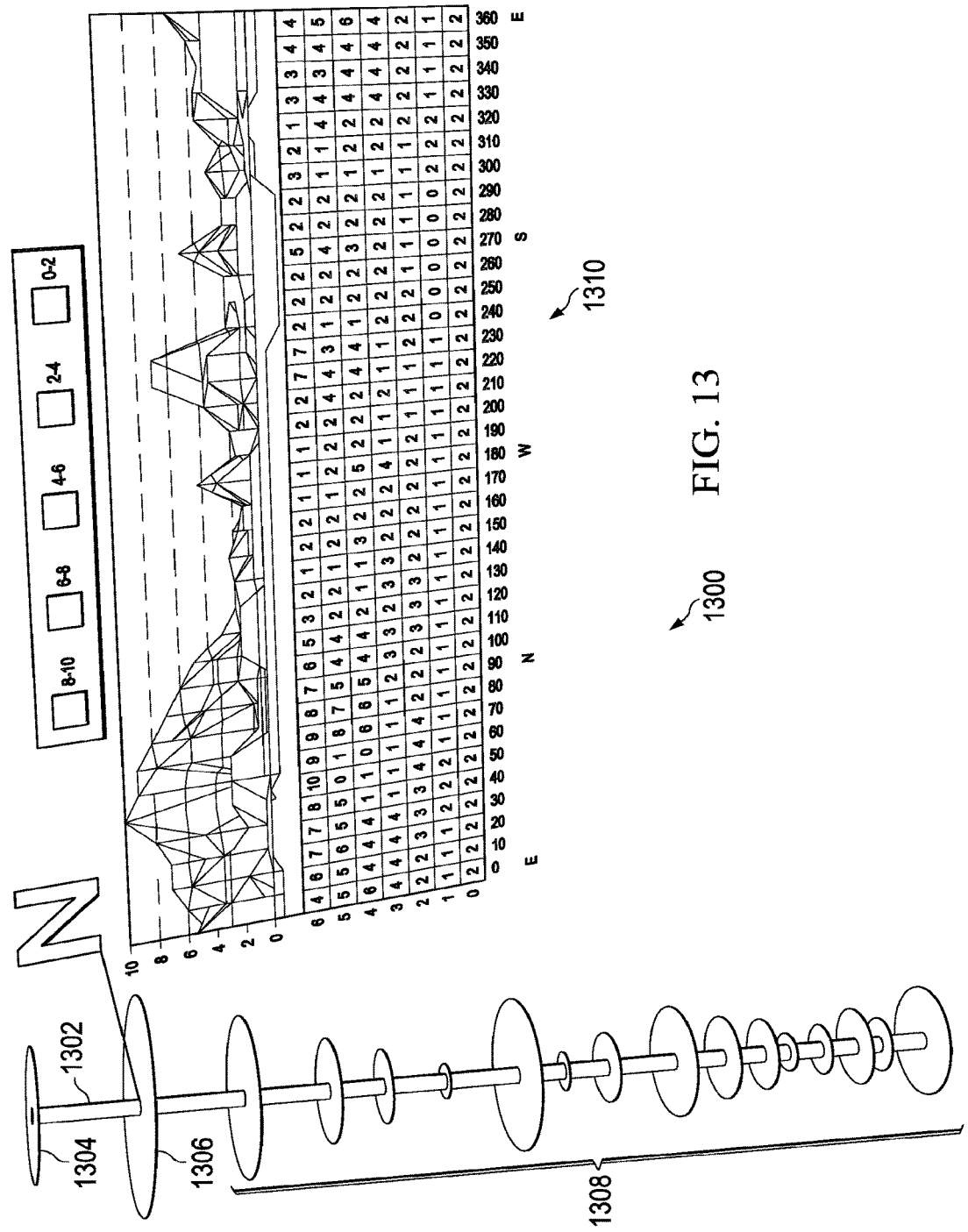
FIG. 13 is a diagram of still another multi-disk model of a subterranean space.

FIG. 13 is a diagram of still another multi-disk model of a subterranean space. Specifically, FIG. 13 shows a model 1300 including a wellbore 1302 and multiple disks 1304, 1306 and 1308 positioned along the wellbore 1302. As explained above, selecting (e.g., clicking with a mouse) one of the disks, such as disk 1306, results in the display of a landscape view (e.g., landscape view 1310) of the data in that disk.

FIGS. 9-12 depict spherical models in the form of disks, each of which provides a 360-degree view in a single plane. The scope of this disclosure, however, is not limited to disks. As described above with respect to FIGS. 8B and 8C, the φ angle may be increased to a value greater than zero to produce a coordinate constellation in the shape of a cone instead of a planar disk. Populating such a cone with corresponding earth model data as described above provides 360-degree views at the φ angle with which that cone corresponds. For example, the cone 842 of FIG. 8C corresponds to a φ angle of 60 with respect to the horizontal plane (or an angle of 30 with respect to the axis of the wellbore). Populating the cone 842 produces a 360-degree azimuthal view at an "upward" φ angle of 60 degrees, thus providing the view that one would have by being within the wellbore and "looking upward" 60 degrees in any azimuthal direction. In at least some embodiments, such cones may be displayed in lieu of, or in addition to, planar disks positioned along a wellbore, and the landscape views just described may be provided upon a user selecting a particular cone of interest.

In addition to displaying illustrations such as those shown in FIGS. 9-12, in some embodiments, a workstation (e.g., workstation 402 in FIGS. 4A and 4B) may provide a geo-modeler with a "walk-around" feature in which the geo-modeler is able to use workstation input devices to simulate travel around any part of the illustration to examine the illustration in greater detail. For example, referring to the model 1100 shown in FIG. 11, movement of a workstation mouse in a forward direction may enlarge the model 1100, giving the geo-modeler the sensation of "walking toward" the model, while moving the mouse in reverse may shrink the model 1100, giving the sensation of "walking away from" the model. The geo-modeler may click, click and drag, move forward and in reverse, and move side to side a mouse or otherwise manipulate any other suitable input device to alter the perspective or view of the model 1100 that the workstation displays. Such a "walk-around" view may be provided for any aspect of the models described herein.

The scope of this disclosure encompasses a wide variety of data that may be used to populate the models described and/or illustrated herein. For example and without limitation, such data may include parameters relating to the wellbore or formation; changes to such parameters; rates of changes for such parameters; and the results of functions calculated using such parameters. In preferred embodiments, these and any other data arc presented in the models from the perspective of a single vantage point within the subterranean space being modeled. In many cases, this point will be within a wellbore such that the landscape views illustrate the data as it would be perceived from within the wellbore. In other embodiments, the point may be within the formation such that the landscape views illustrate the data as it would be perceived from within the formation. The concept of "perspective," however, extends beyond the mere presentation of raw data as may be seen from a particular vantage point. Specifically, "perspective" includes the manipulation of model data to display or emphasize one or more features/data most relevant to that vantage point. For example and without limitation, the radial length used in the spherical coordinate system may be increased or decreased to include or exclude data that may or may not be relevant to the vantage point. Similarly, for instance, a model displaying acceptable pressures inside a wellbore of interest may be modified to increase or decrease these pressures based on the wellbore's proximity to fractures or faults. In this way, the position of the vantage point is taken into consideration to help interpret raw data, and the interpreted data is that which is ultimately displayed within the model.

Figure 14:
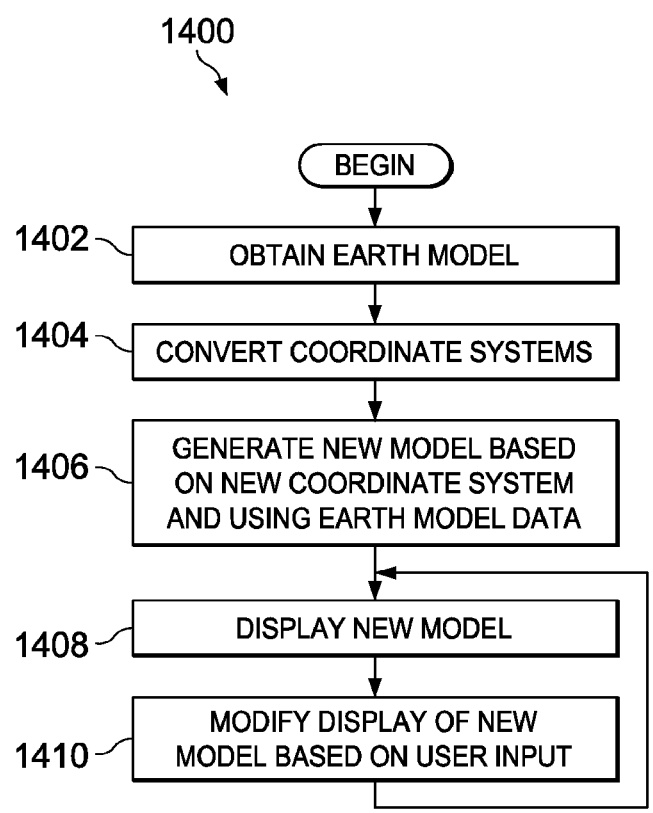
FIG. 14 is a flow diagram of a method usable to generate a model of a subterranean space.

FIG. 14 is a flow diagram of a method 1400 usable to generate a model of a subterranean space. The method 1400 begins, in some embodiments, with obtaining an earth model or, alternatively, data culled from an earth model (step 1402). The method 1400 continues with converting coordinate systems—for example, from a Cartesian system to a polar system or a spherical system (step 1404). The method 1400 then includes generating a new model based on the new coordinate system and using the earth model data (step 1406). The new model, in at least some embodiments, includes a representation of the wellbore and multiple disks positioned along the wellbore. The new model preferably includes providing a landscape view for each of the multiple disks. The method 1400 comprises displaying the new model on a display (step 1408). The display may be modified based on user input—for instance, various features may be enlarged or reduced in size; landscape views may be generated or removed; and planar disks may be enhanced with heat maps and bar or line graphs. The scope of disclosure is not limited to performing the foregoing steps in the order presented in FIG. 14. Steps may be added, removed, modified or rearranged as may be suitable.

At least some of the embodiments in the present disclosure are directed to a method for graphically representing a subterranean space from the perspective of a point within the subterranean space, comprising: obtaining data associated with the subterranean space, said data corresponding to a plurality of coordinates in a first coordinate system; associating the data for each of said plurality of coordinates with one or more corresponding coordinates in a second coordinate system; generating a different model of the subterranean space based on the data and said associations; and displaying the different model on a display, wherein the different model represents the subterranean space from the perspective of a point within the subterranean space. Such embodiments may be supplemented in a variety of ways, including by adding any or all of the following concepts, in any sequence and in any combination: wherein the first coordinate system is a Cartesian coordinate system and the second coordinate system is a spherical coordinate system; wherein the different model represents the subterranean space from the perspective of said point by providing a landscape view of the subterranean space from the perspective of said point; wherein said point is specified by one or more spherical coordinates provided by a user; further comprising representing said different model as a planar disk; further comprising displaying a landscape view of the subterranean space associated with the planar disk as a result of a user selecting the disk; wherein said disk is selected from the group consisting of: a bar graph disk, a line graph disk and a heat map disk; further comprising displaying a representation of a wellbore and multiple disks along said wellbore, each of said multiple disks modeling a different part of the subterranean space; wherein said point is within a borehole; wherein generating the different model comprises providing a 360 degree view of the subterranean space at a φ angle of 90 degrees relative to said borehole; wherein generating the different model comprises providing 360 degree views of the subterranean space at multiple φ angles relative to the borehole; further comprising providing a walk-around view of said different model in response to user input.

At least some embodiments are directed to a method for representing a subterranean space, comprising: identifying data associated with the subterranean space; modifying at least some of said data to produce modified data, said modification accounting for the perspective of a point within the subterranean space; generating a model of the subterranean space based at least in part on the modified data, wherein the model represents the subterranean space with respect to said point within the subterranean space; and displaying said model on a display. Such embodiments may be supplemented in a variety of ways, including by adding any or all of the following concepts, in any sequence and in any combination: further comprising selectively displaying said modified data associated with the model in response to user input; wherein modifying the at least some of said data to produce the modified data comprises applying said at least some of said data to one or more functions; wherein modifying the at least some of said data to produce the modified data comprises determining a rate of change associated with the at least some of said data.

At least some embodiments are directed to a computer-readable medium storing software which, when executed by a processor, causes the processor to: obtain earth model data that corresponds to Cartesian coordinates within a subterranean area; identify a point within the subterranean area and adjust at least some of the earth model data based on said identified point; identify spherical coordinates that correspond to the Cartesian coordinates; generate another model of the subterranean space based at least in part on the adjusted earth model data and the spherical coordinates; and display said another model on a display. Such embodiments may be supplemented in a variety of ways, including by adding any or all of the following concepts, in any sequence and in any combination: wherein the processor represents said another model as a circular disk selected from the group consisting of a heat map disk, a bar graph disk and a line graph disk; wherein the processor displays at least part of the subterranean space using a landscape view; wherein the processor provides a walk-around view of said another model in response to user input.

The following is claimed:

1. A method for graphically representing a subterranean space from the perspective of a point within the subterranean space, comprising:
   obtaining data associated with the subterranean space, said data corresponding to a plurality of coordinates in a first coordinate system;
   selecting a vantage point within the plurality of coordinates in the first coordinate system;
   associating the data for each of said plurality of coordinates with one or more corresponding coordinates in a second coordinate system from the selected vantage point within the plurality of coordinates in the first coordinate system;
   generating a different model of the subterranean space based on the data and said associations; and
   displaying the different model on a display,
   wherein the different model represents the subterranean space from the perspective of the selected vantage point within the subterranean space.

2. The method of claim 1, wherein the first coordinate system is a Cartesian coordinate system and the second coordinate system is a spherical coordinate system.

3. The method of claim 1, wherein the different model represents the subterranean space from the perspective of said point by providing a landscape view of the subterranean space from the perspective of said point.

4. The method of claim 3, wherein said point is specified by one or more spherical coordinates provided by a user.

5. The method of claim 1, further comprising representing said different model as a planar disk.

6. The method of claim 5, further comprising displaying a landscape view of the subterranean space associated with the planar disk as a result of a user selecting the disk.

7. The method of claim 5, wherein said disk is selected from the group consisting of: a bar graph disk, a line graph disk and a heat map disk.

8. The method of claim 5, further comprising displaying a representation of a wellbore and multiple disks along said wellbore, each of said multiple disks modeling a different part of the subterranean space.

9. The method of claim 1, wherein said point is within a borehole.

10. The method of claim 9, wherein generating the different model comprises providing a 360 degree view of the subterranean space at a Ø angle of 90 degrees relative to said borehole.

11. The method of claim 9, wherein generating the different model comprises providing 360 degree views of the subterranean space at multiple Ø angles relative to the borehole.

12. The method of claim 1, further comprising providing a walk-around view of said different model in response to user input.

13. The method of claim 1 wherein the selected vantage point is a center point within the plurality of coordinates in the first coordinate system.

14. A method for representing a subterranean space, comprising:
   identifying data associated with the subterranean space;
   selecting a vantage point within the subterranean space;
   modifying at least some of said data to produce modified data based on the selected vantage point within said data, said modification accounting for the perspective of the vantage point within the subterranean space;
   generating a model of the subterranean space based at least in part on the modified data, wherein the model represents the subterranean space with respect to said vantage point within the subterranean space; and displaying said model on a display.

15. The method of claim 14, further comprising selectively displaying said modified data associated with the model in response to user input.

16. The method of claim 14, wherein modifying the at least some of said data to produce the modified data comprises applying said at least some of said data to one or more functions.

17. The method of claim 16, wherein modifying the at least some of said data to produce the modified data comprises determining a rate of change associated with the at least some of said data.

18. A non-transitory computer-readable medium storing software which, when executed by a processor, causes the processor to:

obtain earth model data that corresponds to Cartesian coordinates within a subterranean area;

identify a vantage point within the subterranean area and adjust at least some of the earth model data based on said identified vantage point;

identify spherical coordinates that correspond to the Cartesian coordinates;

generate another model of the subterranean space based at least in part on the adjusted earth model data and the spherical coordinates from the perspective of the vantage point; and display said another model on a display.

19. The non-transitory computer-readable medium of claim 18, wherein the processor represents said another model as a circular disk selected from the group consisting of a heat map disk, a bar graph disk and a line graph disk.

20. The non-transitory computer-readable medium of claim 18, wherein the processor displays at least part of the subterranean space using a landscape view.

21. The non-transitory computer-readable medium of claim 18, wherein the processor provides a walk-around view of said another model in response to user input.

* * * * *